Sept. 23, 1924.  
J. P. BERNARD  
CUTTING MACHINE  
Filed Nov. 17, 1922  
1,509,389  
2 Sheets-Sheet 1

Inventor,
J. P. Bernard.
By C. A. Snow & Co.
Attorneys

Sept. 23, 1924.
J. P. BERNARD
CUTTING MACHINE
Filed Nov. 17, 1922
1,509,389
2 Sheets-Sheet 2
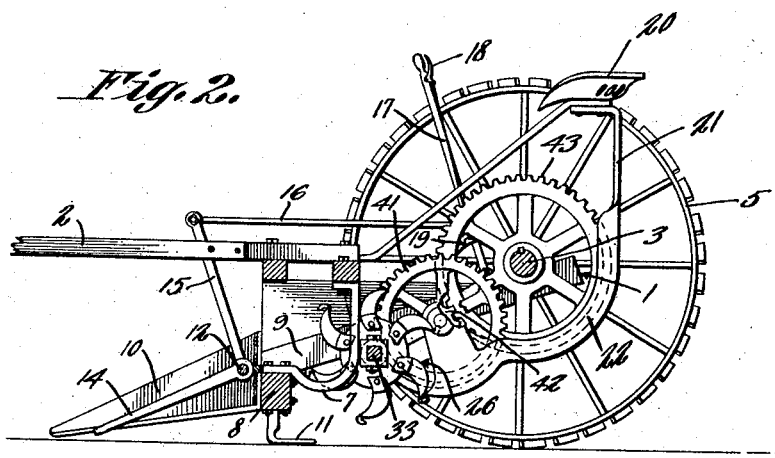
Inventor,
J.P.Bernard.
By
Attorneys Patented Sept. 23, 1924.

1,509,389

UNITED STATES PATENT OFFICE.

JOHN P. BERNARD, OF OROSI, CALIFORNIA.

CUTTING MACHINE.

Application filed November 17, 1922. Serial No. 601,560.

*To all whom it may concern:*

Be it known that I, JOHN P. BERNARD, a citizen of the United States, residing at Orosi, in the county of Tulare and State of California, have invented a new and useful Cutting Machine, of which the following is a specification.

This invention aims to provide a simple means whereby lengths of grape vine and the like lying on the surface of the soil, after a vineyard has been pruned, may be cut up into short lengths, to be turned beneath the soil, for the enrichment thereof.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
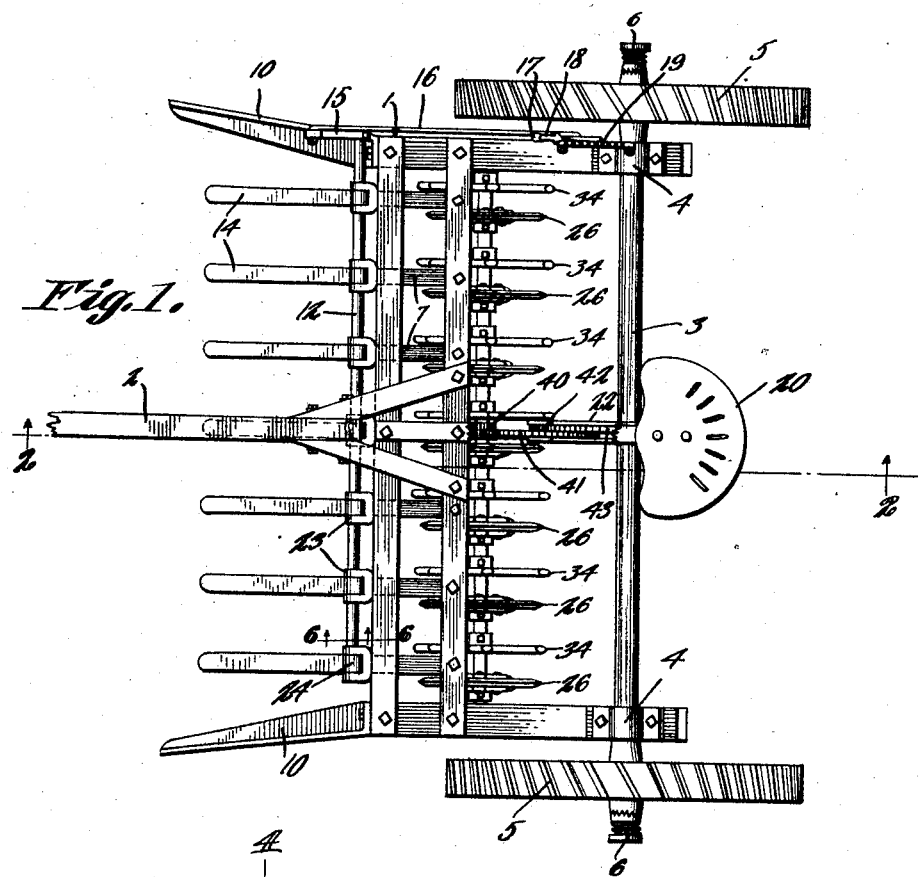
Figure 3:
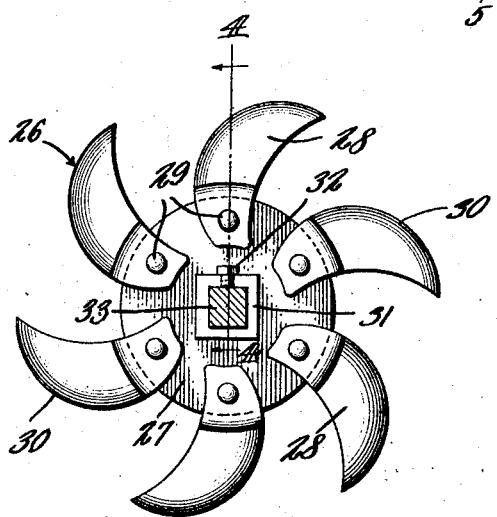
Figure 4:
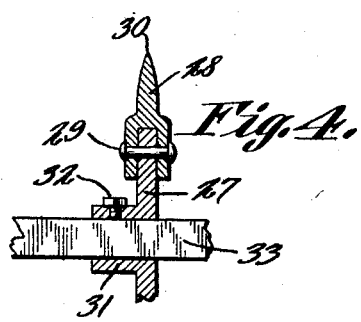

Figure 1 shows in top plan, a machine constructed in accordance with the invention; Figure 2 is a section on the line 2—2 of Figure 1; Figure 3 is an elevation disclosing one of the cutting members; Figure 4 is a section on the line 4—4 of Figure 1; Figure 5 is an elevation disclosing one of the rotatable holders; Figure 6 is a section taken on the line 6—6 of Figure 1; Figure 7 is a section on the line 7—7 of Figure 6.

In carrying out the invention, there is provided a frame 1, of any desired construction, equipped with suitable draft means 2. An axle 3 is journaled at 4 of the frame 1, ground wheels 5 being connected to the axle through the instrumentality of ratchet mechanisms 6, of any desired sort, well understood by those skilled in the art, the ratchet mechanisms being so constructed that when the ground wheels 5 are rotated forwardly, rotation will be imparted to the axle 3 whereas when the ground wheels are rotated rearwardly, rotation will not be imparted to the axle. Depending concaved and forwardly extended supports 7 are carried by the frame 1 and are connected at their forward ends to a beam 8, sustained from the body portion of the frame 1 through the instrumentality of downwardly and forwardly inclined braces 9, the beam and the braces constituting parts of the frame. Outwardly inclined deflectors 10 are mounted on the lower forward portion of the frame 1. The beam 8 carries depending soil-engaging shoes 11.

A horizontal shaft 12 is mounted for rocking movement in forks 23 formed on the forward ends of the supports 7. Forwardly and downwardly inclined rake teeth 14 are supplied and are equipped at their rear ends with hubs 24 held by set screws 25 on the shaft 12. The shaft 12 has an upstanding arm 15 whereunto the forward end of a link 16 is pivoted, the rear end of the link being pivoted to a lever 17 fulcrumed on the frame 1 and provided with a latch mechanism 18, adapted to coact with a segment 19 on the frame, the lever 17 being accessible to a person occupying a seat 20 carried by a bracket 21 on the frame 1, the bracket embodying a forwardly extended curved guard 22.

A squared shaft 33 is mounted to rotate on the braces 9 of the frame, or elsewhere, and carries a plurality of rotary cutting members 26, one of which is shown in detail in Figure 3, each cutting member comprising a body 27 having a hub 31 connected by a set screw 32, or otherwise, to the shaft 33, blades 28 being detachably secured at 29 to the body 27 of the rotary cutting member 26, each blade 28 having a convexed cutting edge 30, the detachable union between the blades 28 and the body 27 permitting the blades to be replaced, should they become dulled or broken.

Rotatable holders 34 are mounted on the shaft 33 in alternating order with respect to the cutting members 26, one of the holders being shown in detail in Figure 5 and it appearing that the holder includes a hub 35 held by a set screw 36 on the shaft 33, the holder embodying outstanding arms 37 having convexed edges 38 which are shaped like the convex edges 30 of the blades 28 of the cutting members 26, the edges 38 of the arms 37 of the holders 34 being alined with the convexed cutting edges 30 of the blades. At their outer ends, the arms 37 terminate in hooks 39.

A pinion 40 is secured to the shaft 33 and meshes with a gear wheel 41 supported for rotation on the guard 22, the guard extending beneath the gear wheel, for an obvious purpose. A pinion 42 is connected to the gear wheel 41 to rotate therewith and meshes with a gear wheel 43 secured to the axle 3.

In practical operation, through the instrumentality of the lever 17, the link 16 and the arm 15, the shaft 12 may be rocked, thereby to vary the angle between the rake teeth 14 and the soil. The vines, as severed from the stock, and lying upon the ground, pass between the deflectors 10, and ride upwardly along the rake teeth 14, the vines being received in the concaved portions of the supports 12. When the cutting members 26 are rotated, the edges 30 of the blades 28 sever the vines into short lengths, and the severed parts of the vines fall to the soil, to be turned thereunder. The vines, whilst they are being cut by the edges 30 of the blades 28 move along the convexed edges 38 of the arms 37 of the holders 34 the hooks 39 at the outer ends of the arms 37 serving to prevent the vines from sliding out of the field of action of the cutting edges 30 of the blades 28, the vines thus being retained upon the supports 7 until the vines have been severed.

When the ground wheels 5 are rotated forwardly, the axle 3 will be rotated, and from the axle, rotation is imparted to the shaft 12, which carries the cutters 36 and the holders 34, through the instrumentality of a gear train embodying the gear wheel 43, the pinion 42, the gear wheel 41 and the pinion 40.

What is claimed is:—

1. A device of the class described embodying a frame; a ground wheel journaled thereon; a support on the frame; a rotatable member journaled on the frame and comprising cutting arms coacting with the support; a rotary holder journaled on the frame at the side of said member and having hooks disposed adjacent to the outer ends of the arms of the rotatable member; and means for driving the rotatable member and the holder from the ground wheel.

2. A device of the class described embodying a frame; a ground wheel journaled thereon; a support on the frame; rake teeth on the frame and discharging into the support; means for varying the angle between the rake teeth and the soil; a rotary cutter journaled on the frame; a rotary holder journaled on the frame at the side of the cutter, and including a projecting portion, the cutter and the holder coacting with the support; and means for driving the cutter and the holder from the ground wheel.

In testimony that I claim the foregoing as my own, I have hereto affixed my signature in the presence of two witnesses.

JOHN P. BERNARD.

Witnesses:
E. R. ELLISON,
J. A. BANKS.